(12) United States Patent
Groen et al.

(10) Patent No.: US 7,832,959 B1
(45) Date of Patent: Nov. 16, 2010

(54) METHOD OF RESTORATION OF A HIGHLY SALINE LAKE

(75) Inventors: Pieter van Groen, De Bult (NL); Jorrit K. de Groot, Rotterdam (NL)

(73) Assignee: Bean Stuyvesant, L.L.C., Belle Chasse, LA (US)

( * ) Notice: Subject to any disclaimer, the term of this patent is extended or adjusted under 35 U.S.C. 154(b) by 997 days.

(21) Appl. No.: 11/379,153

(22) Filed: Apr. 18, 2006

Related U.S. Application Data

(60) Provisional application No. 60/672,310, filed on Apr. 18, 2005.

(51) Int. Cl.
*E02B 13/00* (2006.01)

(52) U.S. Cl. .............................. 405/52; 405/74; 405/80; 210/170.01; 210/170.11

(58) Field of Classification Search ................... 405/52, 405/80, 60, 73, 74; 210/170.01, 170.09, 210/170.11
See application file for complete search history.

(56) References Cited

U.S. PATENT DOCUMENTS

| | | | |
|---|---|---|---|
| 5,322,035 A * | 6/1994 | Hawes et al. | 119/227 |
| 5,807,030 A | 9/1998 | Anderson et al. | |
| 5,902,070 A | 5/1999 | Bradley | |
| 6,623,214 B1 | 9/2003 | Hauske et al. | |
| 6,626,611 B2 | 9/2003 | Winters et al. | |
| 6,726,406 B2 | 4/2004 | Gilmore et al. | |
| 6,773,595 B2 | 8/2004 | Gantzer | |

OTHER PUBLICATIONS

Neal Matthews, Sea Change: Some Farmers Offer up Their Plan of Action, Mar. 9, 2005, the Union-Tribune.*
Proposed Salton Sea Authority Plan, Enhanced Circulation Design, Jul. 22, 2005.*
Salton Sea Restoration—The Cascade Alternative, Presented by: The Salton Sea Restoration Consortium, Oct., 2004, pp. 1-55.*

* cited by examiner

*Primary Examiner*—David J Bagnell
*Assistant Examiner*—Benjamin Fiorello
(74) *Attorney, Agent, or Firm*—Garvey, Smith, Nehrbass & North, L.L.C.; Charles C. Garvey, Jr.

(57) ABSTRACT

A method of restoring a lake that has a high saline level is disclosed herein. In order to restore the lake, a series of concentric dikes or levees are provided that separate the lake into a plurality of smaller lake sections, each having a water surface. The smaller lake sections include an outer lake section which is next to the periphery of the lake and one or more inner lake sections. Each dike and each smaller lake section water surface have an elevation. Water is flowed from an influent source to the outer lake section and then to each of the inner lake sections. The outer lake section surface has a higher elevation. The inner lake section surfaces have cascading lower surface elevations. At a central area, a breathing brine area is provided that is surrounded by the smaller lake sections to provide an area that can be used to concentrate brine. The smaller lake sections can have differing salinity levels for sustaining diverse marine and plant life.

48 Claims, 5 Drawing Sheets

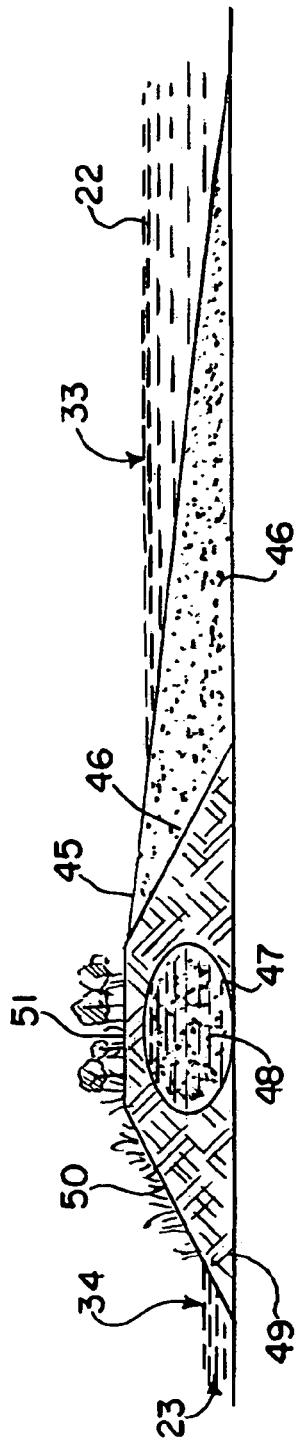
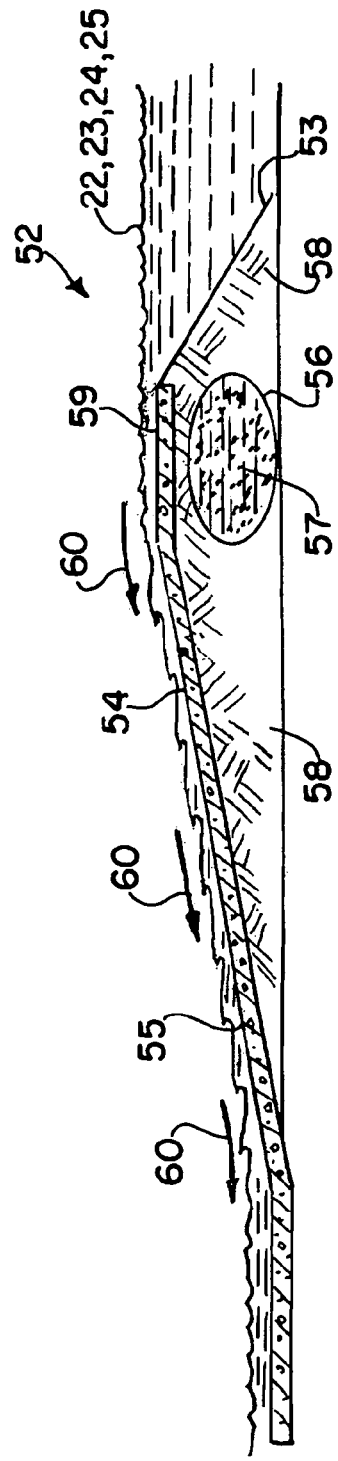

METHOD OF RESTORATION OF A HIGHLY SALINE LAKE

CROSS-REFERENCE TO RELATED APPLICATIONS

Priority of U.S. Provisional Patent Application Ser. No. 60/672,310, filed Apr. 18, 2005, incorporated herein by reference, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to restoration of a lake having a high saline content. More particularly, the present invention relates to an improved method of restoring a highly saline lake that utilizes inner and outer dikes or levees (preferably concentrically positioned), elongated smaller lakes formed between the dikes, a central area providing one or more breathing brine fields, wherein salinity of inflow gradually increases from outer lake to the inner lakes to the breathing brine field or fields. In the process, the overall lake water inflow needed to maintain several separate yet healthy lake ecosystems can be reduced.

2. General Background of the Invention

The Salton Sea is located in a closed basin in Riverside and Imperial Counties in southern California, south of Indio and north of El Centro. The Salton Sea is more than 220 feet below sea level and has no natural outlet. The Salton Sea Basin is part of the lower Colorado River delta system. Historically, lakes have existed in this basin as the course of the Colorado River has shifted. The current body of water (Salton Sea) was formed in 1905 when a levee break along the Colorado River caused flows from the Colorado River to enter the basin for about 18 months. Since 1905, the Salton Sea has fluctuated in size with varying inflow. It recently has had a surface area of 365 square miles.

Currently, the Salton Sea is filled by the agricultural runoff from the Colorado River Basin. In particular, approximately 80% of Salton Sea inflows come from the Imperial Valley. Since the Salton Sea has no outlet, evaporation produces the only export of water. Nearly all constituents in the inflow, such as salts, nutrients and fertilizers remain in the Salton Sea. Currently, the Sea is approximately 25% saltier than ocean water, with a continuing trend of increasing salinity. Eventually, a point will be reached where current biological activity in the Sea will cease, as is the case with other highly saline lakes such as Mono Lake. Under these highly saline conditions the benthic organisms that support the current ecology of the Salton Sea could no longer survive. The fisheries supported by those organisms would likewise disappear, and have practically vanished already. An ecology based on organisms adapted to highly saline conditions, such as brine shrimp, would result. Even under existing conditions, a project for the restoration of the Salton Sea (including improvement and stabilization of the water quality) is critically needed.

Accelerating these effects would be the reduced inflows to the Salton Sea anticipated under the 2003 Quantification Settlement Agreement (QSA). The QSA provides for the phased transfer of up to 560,000 acre-feet per year of water from agricultural to urban uses, resulting in a significant reduction of agricultural flows to the Sea, of at least 300,000 acre-feet per year. It is assumed that a water transfer of approximately the scale of that contemplated by the QSA will result in reduced inflows to the Salton Sea.

In future years, additional transfers may also occur as demand increases in the expanding urbanized areas of Southern California. For example, the Metropolitan Water District of Southern California (MWD) has pending a water rights application with the State Water Resources Control Board (SWRCB) seeking to divert all of the flows from the Alamo River and other agricultural sources that would otherwise reach the Salton Sea.

Filed in 1997, MWD's application contends that it has the right to take much of the inflow of the Salton Sea and divert it to its service area for various uses. MWD supplemented its application in June 2004 and reiterated that it continues to seek the inflows for diversion, although it recognizes that the amount of the inflows may be reduced due to various conservation measures described in the QSA.

If an appropriate Salton Sea restoration plan is not implemented, a substantial portion of the inflow may be diverted permanently from the Salton Sea area such that no restoration would be possible. The resulting reduction in inflows would be severe, ranging from approximately 400,000 to 450,000 acre feet per year, with net inflows to the Salton Sea being reduced to as low as 468,000 acre feet per year (assuming diversions comparable to that contemplated under the QSA).

Over time, those smaller inflows will result in a reduction in the surface area of the Sea. This reduction could expose previously inundated sediments. The reduced water volume in the Salton Sea will also result in a corresponding increase in salinity. Without affirmative restoration activities, a number of adverse environmental consequences would result, such as a reduction of the Sea's important habitat values for the Pacific Flyway, increased air pollution, and decreased aesthetics values.

Any restoration plan must solve both of the key problems faced by the Salton Sea, water quality and water quantity. Over the years, a number of options have been explored for addressing these concerns. In 1998, the Salton Sea Authority, in a joint lead with the federal Bureau of Reclamation, initiated an environmental review of a number of alternatives to address the problems that existed at the time. These alternatives primarily focused on "whole-sea" restoration approaches such as the conveyance of water to and/or from the ocean to address the elevation and salinity problems, various evaporation options to facilitate the removal of salt, and desalination options using vertical tube evaporation technology. This effort, however, was not completed, primarily due to critical problems identified with all of the alternatives being evaluated, such as excessive costs or environmental impacts.

In April 2004, the Salton Sea Authority (SSA) evaluated four "reasonable" restoration alternatives: (1) no marine lake; (2) south marine lake without elevation control; (3) south marine lake with elevation control, and (4) north marine lake with elevation control. The SSA ultimately concluded that the North Lake concept, combined with other features, was its preferred project.

After much discussion between DWR and the interested parties, four alternatives, two of which draw upon the work completed by the Salton Sea Authority in 2004, gained prominence as a reasonable range for the alternatives evaluation: (1) the "Low Sea" alternative, which allows the sea level to drop and involves the construction of a relatively small brine pond, (2) the "Shore Lake" alternative, which involves the creation of a relatively deep short lake along the entire perimeter of the current sea, separated from a dry area and brine pond in the interior by a dike (similar to the SSA's In-Sea Solar Evaporation Pond alternative, but with a different configuration), (3) the "North Lake" alternative (the SSA's "North Lake with elevation control" alternative) which separates the sea with a relatively high dam and allows the southern portion of the lake to largely dry out, except for a brine pond, and (4) the "South Lake" alternative (the SSA's "South Lake with elevation control" alternative) which is similar to the North Lake alternative with the dry areas and brine pond to the north.

The Salton Sea Reclamation Act of 1998 formulates the goals of the restoration as follows: continue to use the Sea as a reservoir for irrigation drainage; reduce and stabilize the overall salinity of the Sea; stabilize surface elevation of the Sea; reclaim, in the long-term, healthy fish and wildlife resources and their habitats; and enhance the potential for recreational uses and economic development of the Sea.

The 2000 Draft EIS/EIR on restoration of the Salton Sea prepared by USER and the Salton Sea Authority revised the fourth of these objectives as follows: provide a safe, productive environment at the Sea for resident and migratory birds and endangered species.

The state QSA implementing legislation requires that the preferred alternative provide, to the maximum extent feasible, for attainment of three key objectives, which further refine the habitat objective and add an objective relating to the air quality impacts: restoration of long-term stable aquatic and shoreline habitat for the historic levels and diversity of fish and wildlife that depend on the Salton Sea; elimination of air quality impacts from the restoration projects; and protection of water quality.

Additionally, in order to be successful, the project will need to be economically viable, implying the following objective: plan, construct, develop and operate the restoration project within the practical economic constraints of available funding sources and maximizing economic benefits.

As with these economic factors, in order to be successful the project must be one that can receive all required permits and other entitlements, satisfying the following objectives: qualify the project as the Least Environmentally Damaging Alternative under the Clean Water Act 404(b) (1) guidelines; ensure that the project avoids jeopardy to endangered or threatened species, or the adverse modification of designated critical habitat, and otherwise meets USFWS permitting requirements; comply with Clean Air Act general conformity requirements; and fully comply with all other regulatory programs.

A number of other practical factors also need to be addressed in the selection and implementation of an alternative: 1) ensure timely achievement of project benefits; 2) maximize collateral benefits of the project, particularly the provision of effective water storage capacity that can assist in the management of fluctuating Colorado River flows, and conveyance of water from the IID inflows to other potential users; 3) allow for flexibility of design and construction, in particular to adjust to the actual pattern of water transfers over the coming decades; 5) minimize seismic risks; 6) maximize public acceptance; and 7) maximize the active participation of the local residents in the construction of the project.

The following U.S. Patents are possibly related to lake restoration and are each incorporated herein by reference.

TABLE

| PAT. NO. | TITLE | ISSUE DATE |
|---|---|---|
| 5,807,030 | Stabilizing Elements for Mechanically Stabilized Earthen Structure | Sep. 15, 1998 |
| 5,902,070 | Geotextile Container and Method of Producing Same | May 11, 1999 |
| 6,623,214 | Modification of Geotextile Tubes | Sep. 23, 2003 |
| 6,626,611 | Beach Restoration and Regeneration Systems, Methods and Compositions | Sep. 30, 2003 |
| 6,726,406 | In Situ Formation of Reactive Barriers for Pollution Control | Apr. 27, 2004 |
| 6,773,595 | Compartmentalized Facultative Lagoon and Method of Creating and Maintaining Such a Lagoon | Aug. 10, 2004 |

BRIEF SUMMARY OF THE INVENTION

The method of the present invention provides a series of concentric dikes that can be formed through the installation of geotubes, which are used to create "cascade" levels or terraces of wetlands, ponds and marine lakes.

The method of the present invention optionally provides a wide variation of wetlands, ponds and marine lakes, from deep to shallow and from nearly fresh to ocean salinity. The range of habitats meet the needs of eco-tourism, water recreation and fishing while decreasing salinity, protecting the environment and protecting farmland which depends on conditions created by the sea.

The flexible design of the present invention allows to adjust the remaining total wet surface to the actual remaining inflows, hence to the actual transfers. In view of all uncertainties around the transfers, the flexibility of the design is essential.

The main construction consists of many hundreds of miles of small low head dikes which is attractive in view of safety (compare to high head dams in seismic areas). Also the type of dike construction (e.g. geotube) will enhance safety. Repetition of elements facilitates optimization and efficiency during the phased implementation.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein:

FIG. 6 is a sectional view illustrating the restoration method of the present invention; and FIG. 7 is a sectional view illustrating the restoration method of the present invention.

DETAILED DESCRIPTION OF THE INVENTION

Figure 1:
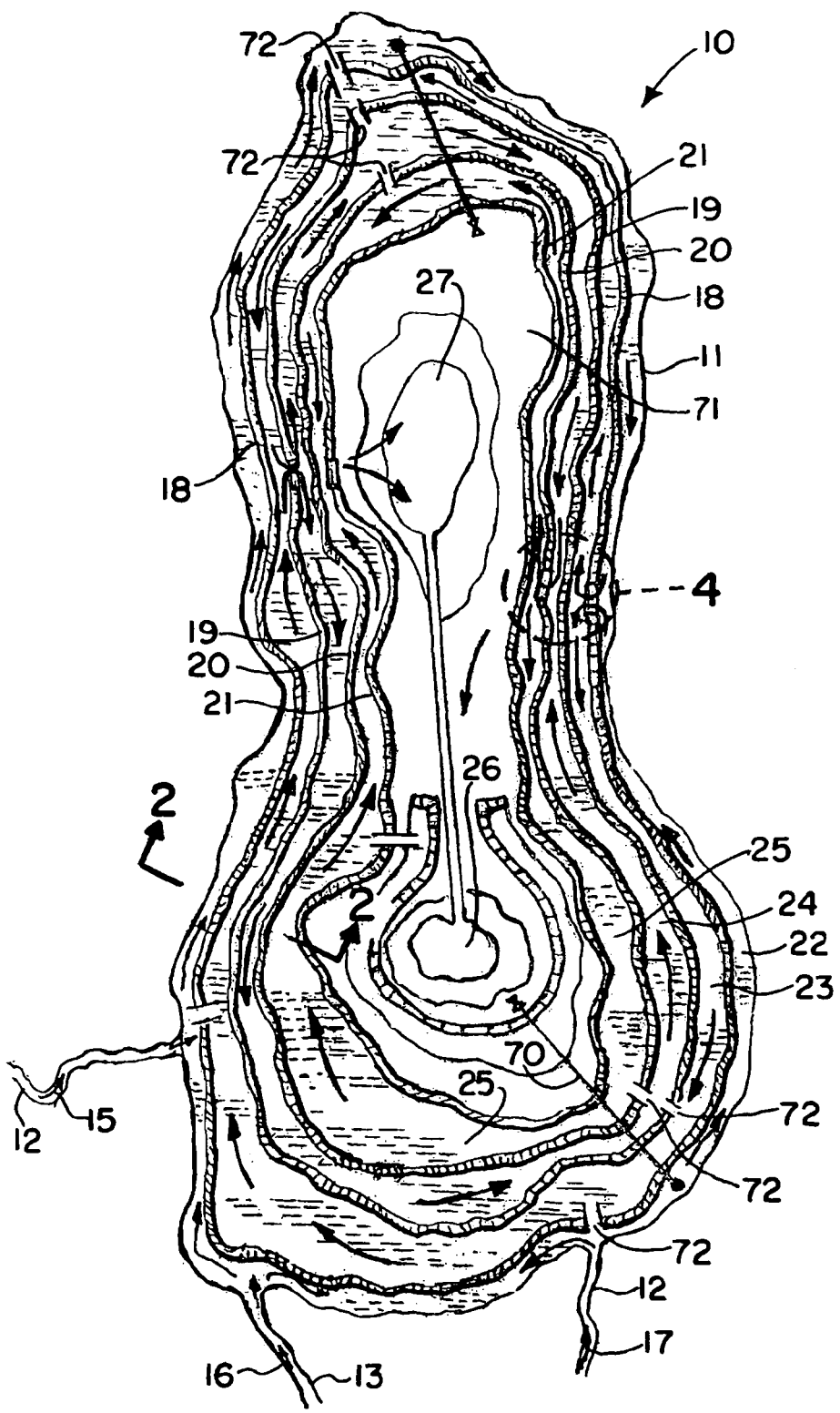
FIG. 1 is a plan view illustrating the preferred embodiment of the restoration method of the present invention.
Figure 2:
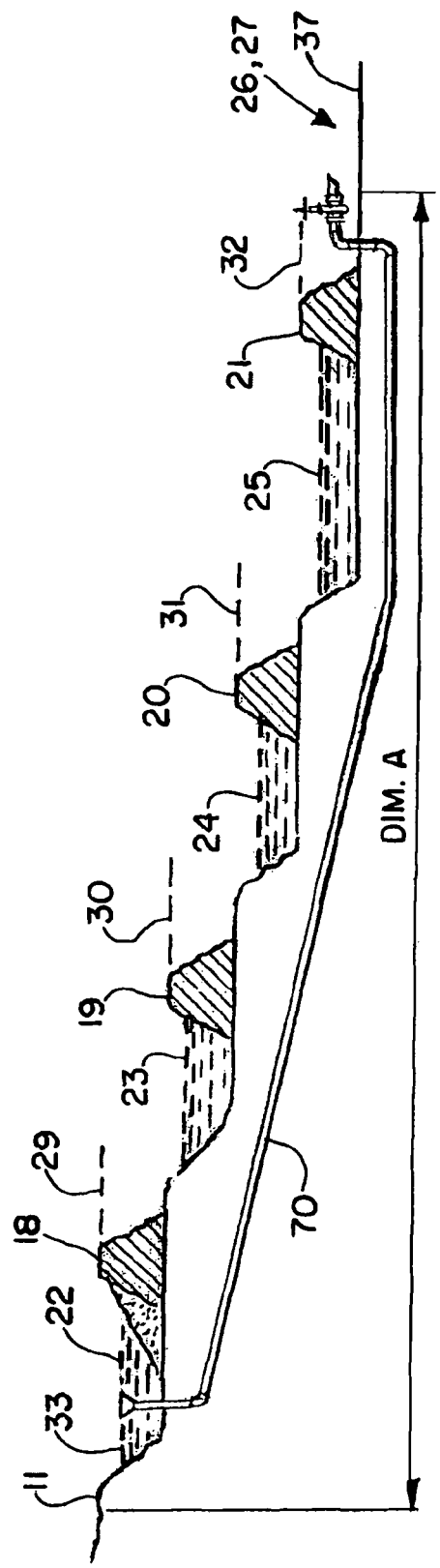
FIG. 2 is a sectional view illustrating the restoration method of the present invention.

In FIGS. 1-2, a saline lake 10 is shown that has a shoreline 11. However, it should be understood that FIG. 1 is illustrative and not to scale. The saline lake 10 can be a lake that receives inflow from one or more influent streams 12, 13, 14. The method and apparatus of the present invention can be used to restore an existing saline lake such as the Salton Sea located in Southern California. In FIG. 1, each influent steams 12, 13, 14 is provided with an arrow 15, 16, 17 respectively that indicates the direction of flow.

The influent streams 12, 13, 14 can be existing rivers. A lake that is receiving an influent stream, influent streams, or an influent flow containing salt can increase in salinity. This problem is compounded if the lake does not have an outflow as is the case with the Salton Sea. If there is no outflow, as water flows from the influent streams 12, 13, 14 into the lake 10, the only way for the water to escape from the lake 10 is by evaporation. Evaporation results in a concentration of salt within the sea 10 raising levels of salinity. Increased salinity can threaten the ecosystem if those levels become too high for the animals and plants of the lake ecosystem. In the case of the Salton Sea, there are other (human) demands for water that flows in the influent streams 12, 13, 14, possibly diverting all or part of that water. Water districts want the influent water or streams 12, 13, 14 for city use near the Salton Sea.

The method of the present invention solves the problem of restoring the lake 10 by creating a number of smaller lakes or smaller lake sections 22, 23, 24, 25. Each lake section 22, 23, 24, 25 is capable of having a different level of salinity. Each is capable of functioning as a separate ecosystem for sustaining plant and animal life based on the salinity of the particular smaller lake section 22, 23, 24 or 25.

In accordance with the method of the present invention, the saline lake 10 is divided into a number of smaller lake sections 22, 23, 24, 25 using a plurality of levees or dikes. These dikes 18, 19, 20, 21 are preferably concentrically placed. These levees or dikes include preferably an outer dike 18, first inner dike 19, second inner dike 20 and third inner dike 21. It is possible to perform the method and apparatus of the present invention using more or fewer levees/dikes. At the central portion of the saline lake 10 (inside levee or dike 21), there is provided one or more breathing brine areas 26, 27.

Figure 3:
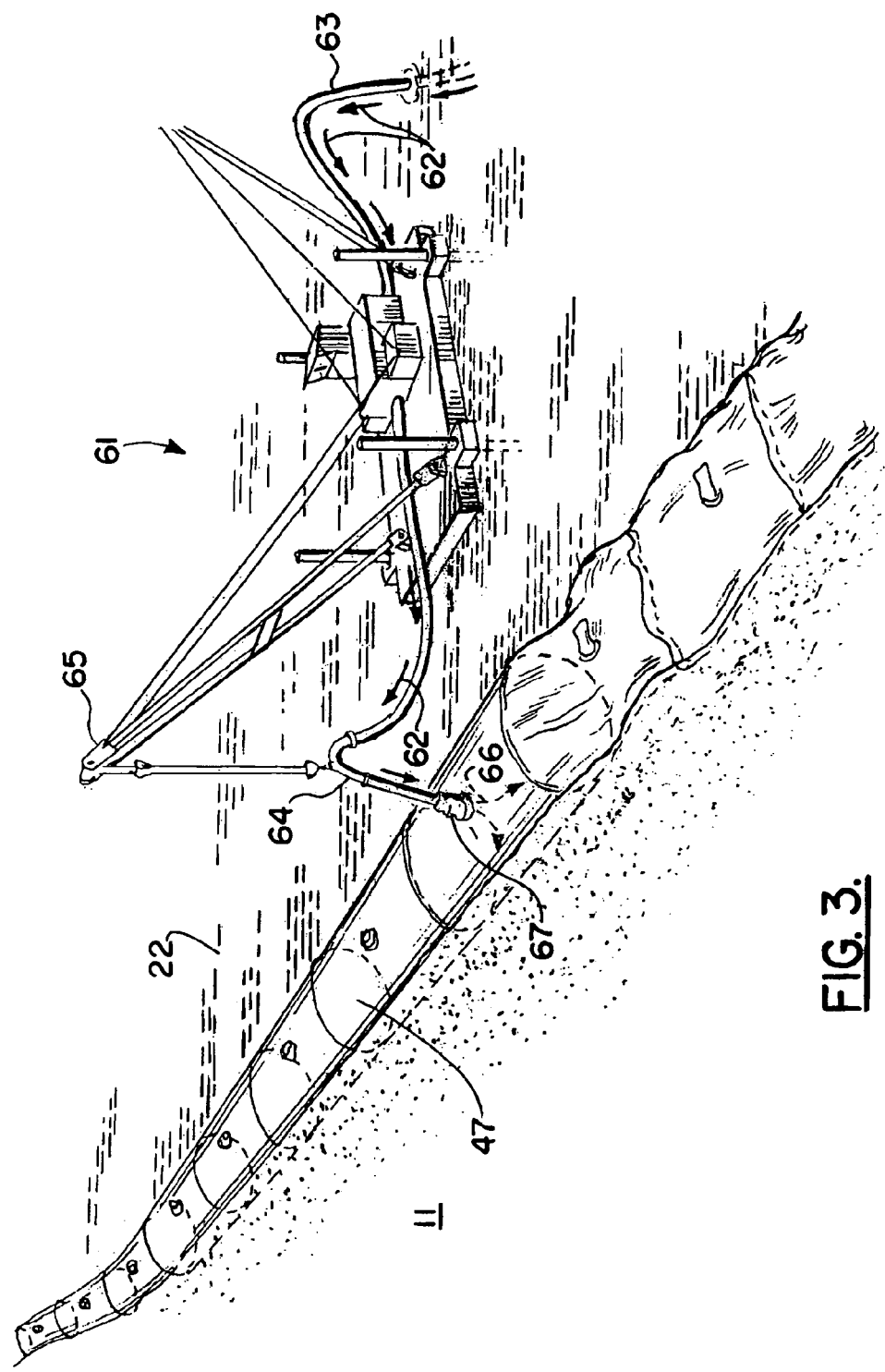
FIG. 3 is a perspective view illustrating the restoration method of the present invention.
Figure 4:
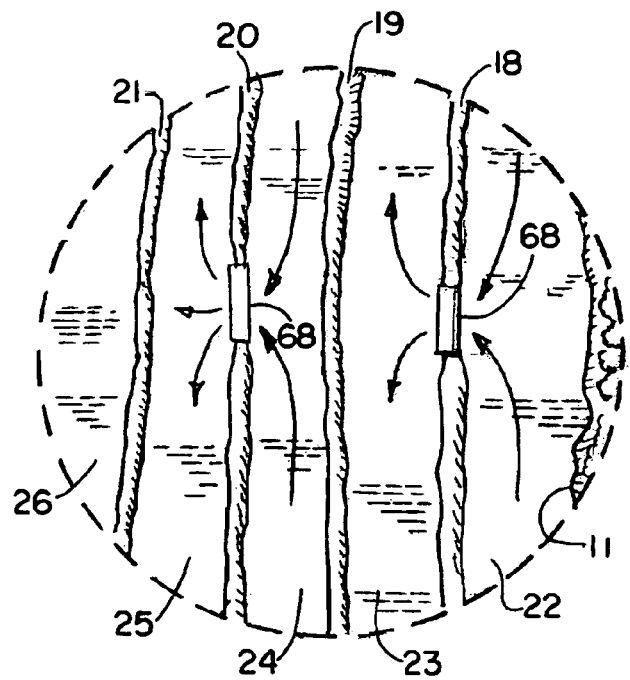
FIG. 4 is a fragmentary schematic plan view showing the use of flow controls in the dikes.

In FIGS. 2-4, schematic illustrations show more particularly the construction detail for the plurality of dikes or levees 18, 19, 20, 21 and the relative elevations of the dikes 18, 19, 20, 21 and the smaller lake sections 22, 23, 24, 25. In FIGS. 1-2, the saline lake 10 has a shoreline 11 that basically defines the periphery of the lake 10. As part of the method of the present invention and as illustrated in FIGS. 2-3, a first, smaller outer lake section 22 is formed in between shoreline 11 and a first dike or levee 18. In FIG. 3, this method is illustrated using a suction dredge 61. The dredge 61 initially places geotextile tube 47 and fills it with available fill or sediment or other material that is available to the dredge 61.

In FIG. 2, the first smaller lake section 22 that is formed provides an outermost smaller lake section 22 that surrounds the remaining smaller lake sections 23-25 and a central breathing brine pond area or areas 26, 27. An interconnecting canal 69 can be used to enhance transmission of highly saline water between the ponds 26, 27. A siphon or siphons 70 can be used to transfer fluid between any river 12, 13, 14 and any selected lake 22, 23, 24, 25 or pond 26, 27. As an example, siphon 70 enables water flow between lake 22 and the area 71 inside levee 21. A siphon 70 can be used to connect areas preferably near the inflow (12, 13 or 14) with relatively fresh water to the dry areas 71 around the brine areas 26, 27 to facilitate irrigation (e.g. in view of dust control). Navigation locks 72 enable navigation between the lakes 22, 23, 24, 25. In between two lakes (e.g. 22, 23) with different water levels there should be at least one lock 72 to facilitate navigation. Thus, there would be provided at least three locks 72 needed to connect the four lakes 22, 23, 24, 25.

In FIG. 2 dimension "A" designated by the numeral 28 illustrates the distance that is spanned by the plurality of smaller lake sections 22, 23, 24, 25. In viewing FIG. 1, it can be seen that this dimension "A" 28 will vary and can be determined by contour lines. The crest elevation of each dike or levee 18, 19, 20, 21 will preferably be at a constant elevation for each particular dike or levee 18, 19, 20, 21.

In FIG. 2, the outer dike 18 has a crest elevation 29 that can, for example, be −228 feet. This would be an elevation that would maintain a water surface elevation 33 of the outer, smaller lake section 22 of preferably about −230 feet, as an example.

Dike or levee 19 has a crest elevation 30 (e.g. −240) for maintaining a second smaller lake section 23 with a water surface elevation 34 of, for example, −242 feet. Dike or levee 20 provides a crest elevation 31 (e.g. −250 feet) for maintaining a third smaller lake section 24 having a water surface elevation 35 of, for example, −252 feet. Finally, dike or levee 32 has a crest elevation 30 of, for example, −260 feet for maintaining a fourth smaller lake section 25 with a water surface elevation 36 that can be about −262 feet, for example.

The breathing brine areas 26, 27 have a brine area elevation 37 that is below the elevation of crest 30 of levee 32 such as, for example, about −270 feet. These elevations are merely exemplary, and are not deemed to limit the scope of the present invention.

Figure 5:
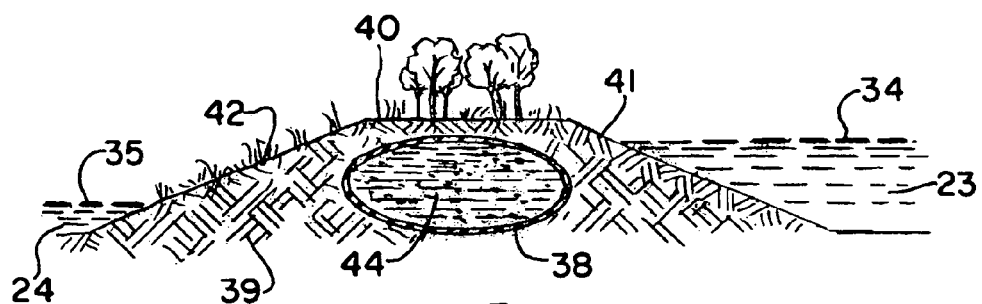
FIG. 5 is a sectional view illustrating the restoration method of the present invention.

FIGS. 5, 6 and 7 show details of construction that can be used for the dikes or levees 18, 19, 20, 21. In FIG. 6, a geotextile tube 38 can be filled with fill material 44 that is made available for suction dredge 61. Fill material 44 can be pumped into geotextile tube 38. After being filled with material 44, the tube 38 can then be surrounded with additional fill material 39 to provide the dike or levee shape that is shown in FIG. 5. For example, in FIG. 5, the dike or levee 19 provides a crest 40, upstream face 41, and downstream face 42. The main construction consists of many hundreds of miles of small low head dikes which is attractive in view of safety (compare to high head dams in seismic areas). Also the type of dike construction (e.g. geotube 47) will enhance safety. Repetition of elements facilitates optimization and efficiency during the phased implementation.

In FIG. 6, the dike or levee 18 represents the outermost dike or levee that would face homes, parks or the like that are located near the shoreline 11. A beach fill material 46 can be applied at the upstream face 45 as shown in FIG. 6. In FIG. 6, a geotextile tube 47 is filled with pumped fill material 48 that can be pumped into the tube 47 using suction dredge 61. The geotextile tube 47 can be surrounded with fill material 49 to provide a desired shape for the dike or levee 18, providing a crest 51, downstream face 50 and upstream face 45. The levee 18 separates smaller lake section 22 from smaller lake section 23.

FIG. 7 shows a spillway section 52 that could be provided to any one of or all of the dikes or levees 18, 19, 20, 21. The spillway section 52 has an upstream face 53, downstream face 54, and a concrete layer 55 that can be applied to the downstream face 54. Geotextile tube 56 is filled with pumped fill material 57 using suction dredge 61. Additional fill material 58 is placed around the filled geotextile tube 56 to provide a dike or levee shape having upstream face 53, crest 59, and downstream face 54. Arrows 60 in FIG. 8 indicates schematically the flow of water over spillway section 52 as an emergency flow controller in the event of heavy rain or like weather that increases dramatically the influent flow from influent sources such as streams 12, 13, 14 to lake 10.

Flow controllers 68 can be used to control the flow from one smaller lake section 22 to the following, downstream lake sections 23 or 24 or 25. A siphon 70 can be used to control the flow between the innermost smaller lake section 25 and the breathing brine areas 26, 27. Flow controllers 68 are schematically shown in FIG. 5 and can include any number of known flow controllers such as weirs, siphons, valves, pumping stations, lift stations, or the like.

The present invention thus provides a method of restoring a saline lake 10 by dividing the lake 10 into smaller lake sections 22, 23, 24, 25. Because the influent streams 12, 13, 14 flow first into an outer smaller lake section 22, flow control devices 68 allow water to flow to the next lake section 23 when the influent streams 12, 13, 14 have elevated the surface 33 of lake section 22 to a selected first elevation.

Water flows from the lake section 22 to the lake section 23. Similarly, the elevation 34 of lake section 23 is set using a weir or other flow controller 68. In this fashion, levees 18, 19, 20, 21 and flow controllers 68 such as weirs, or the like can be used to create a cascade effect wherein the elevations of the lake sections 22, 23, 24, 25 gradually decrease from the outermost lake section 22 to the innermost lake section 25. The flow controllers 68 are positioned to prevent short circuiting of flow (see arrows 43 in FIGS. 1 and 4). The breathing brine areas 26, 27 would have an elevation 37 that is lower than the elevation 36 or the innermost lake section 25. The dikes or levees 18, 19, 20, 21 as shown and described form the smaller lake sections 22, 23, 24, 25.

By maintaining selected water surface elevations 33, 34, 35, 36 for the lake sections 22, 23, 24, 25 the salinity gradually increases as water flows from the influent streams 12, 13, 14 to the outer smaller lake section 22, to the next lake section 23, then to the other lake sections 24, 25 in sequence and finally to the breathing brine areas 26, 27. The relatively fresh inflowing waters (12, 13, 14) will flow through the chain of lakes 22, 23, 24, 25. In each lake 22, 23, 24, 25 some water disappears by evaporation so for each lake it holds that the salinity of the outflow is higher than the salinity of the inflow. (This has nothing to do with evaporation time). At the end of this chain the salt waters will enter the brine ponds 26, 27. With the high laying inflow and low laying brine the flow through the lakes is under gravity (each downstream lake lies a little bit lower than the upstream one).

This system of a plurality of dikes 18, 19, 20, 21 and smaller lake sections 22, 23, 24, 25 ensures that each lake section 22, 23, 24, 25 can have a distinct ecosystem that is defined by the salinity of water contained. Similarly, the crest of each dike or levee 18, 19, 20, 21 can provide a land mass area that can grow vegetation that is compatible with the salinity level of the adjacent lake sections.

Each of the lake sections 22, 23, 24, 25 can be sized to support selected fisheries and marine life, or for certain water sport use (e.g. boating, sailing).

The following is a list of parts and materials suitable for use in the present invention.

| PARTS LIST | |
|---|---|
| Part Number | Description |
| 10 | saline lake |
| 11 | shoreline |
| 12 | influent stream |
| 13 | influent stream |
| 14 | influent stream |
| 15 | arrow |
| 16 | arrow |
| 17 | arrow |
| 18 | outer dike |
| 19 | first inner dike |
| 20 | second inner dike |
| 21 | third inner dike |
| 22 | smaller lake section |
| 23 | smaller lake section |
| 24 | smaller lake section |
| 25 | smaller lake section |
| 26 | breathing brine area |
| 27 | breathing brine area |
| 28 | dimension A |
| 29 | crest elevation |
| 30 | crest elevation |
| 31 | crest elevation |
| 32 | crest elevation |
| 33 | water surface elevation |
| 34 | water surface elevation |
| 35 | water surface elevation |
| 36 | water surface elevation |
| 37 | brine area elevation |
| 38 | geotextile tube |
| 39 | fill material |
| 40 | crest |
| 41 | upstream face |
| 42 | downstream face |
| 43 | arrow |
| 44 | pumped fill material |
| 45 | upstream face |
| 46 | beach fill material |
| 47 | geotextile tube |
| 48 | pumped fill material |
| 49 | fill material |
| 50 | downstream face |
| 51 | crest |
| 52 | spillway section |
| 53 | upstream face |
| 54 | downstream face |
| 55 | concrete layer |
| 56 | geotextile tube |
| 57 | pumped fill material |
| 58 | fill material |
| 59 | crest |
| 60 | arrow |
| 61 | suction dredge |
| 62 | arrow |
| 63 | suction line |
| 64 | discharge line |
| 65 | boom |
| 66 | arrow |
| 67 | fitting |
| 68 | flow controller |
| 69 | canal |
| 70 | siphon |
| 71 | area |
| 72 | navigation lock |

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

The invention claimed is:

1. A method of restoration of a highly saline lake having a periphery, a water bottom, and an influent water source that enables water to be added to the lake, comprising the steps of:
   a) forming a series of dikes that separate the highly saline lake into a plurality of smaller lakes, each having a water surface, the lakes including an outer lake that is next to the periphery and one or more inner lakes, each dike and each lake water surface having an elevation;
   b) flowing water from the influent source to the outer lake;
   c) flowing water from the outer lake to the inner lakes;
   d) providing a breathing brine area that is surrounded by the smaller lakes;
   e) flowing water from the inner lakes to the breathing brine area;
   f) cascading water in steps "c" through "e" from one lake to another lake with simultaneous drops in elevation beginning at the outer lake, then to the inner lakes and then to the brathing brine area; and
   g) gradually increasing the salinity of the water that flows in steps "c" through "f".

2. The method of claim 1 wherein the outer lake has a lower salinity level than the salinity of any of the inner lakes.

3. The method of claim 1 wherein there are at least two inner lakes.

4. The method of claim 1 wherein there are at least three inner lakes.

5. The method of claim 1 further comprising providing the breathing brine area at a position that is surrounded by all of the inner lakes.

6. The method of claim 5 further comprising maintaining in the breathing brine area some dry land.

7. The method of claim 5 further comprising maintaining in the breathing brine area a brine reservoir having some water with a high salinity that is higher than the salinity of at least one of the smaller lakes.

8. The method of claim 5 further comprising maintaining in the breathing brine area a brine reservoir having some water with a high salinity that is higher than the salinity of water in multiple of the smaller lakes.

9. The method of claim 1 wherein each dike has an upper average elevation, and the dikes have differing respective upper elevations.

10. The method of claim 9 wherein each dike that surrounds another dike has a greater upper average elevation than the dike it surrounds.

11. The method of claim 1 wherein the dikes are concentric.

12. The method of claim 11 wherein the smaller lakes have a total water volume that is about half the volume of the saline lake.

13. The method of claim 1 wherein the smaller lakes are concentric lakes.

14. A method of restoration of a saline lake having a periphery, a water bottom, and an influent water source that enables water to be added to the lake, comprising the steps of:
   a) forming a series of dikes that separate the saline lake into a plurality of smaller lakes, each with a water surface, the lakes including an outer lake that is next to the periphery and one or more inner lakes, each dike and each lake water surface having an elevation;
   b) enabling a water flow path that sequentially transmits water from the influent water source to the outer lake, to the inner lakes and then to a breathing brine area;
   c) allowing salt to concentrate at the breathing brine area as water evaporates from the breathing brine area;
   d) enabling water to at times accumulate in the breathing brine area, said water flowing to the breathing brine area at least in part from an inner lake;
   e) concentrating the saline content of the water in steps "b" through "d" in greater concentrations as the water flows from the outer lake to the inner lake; and
   f) cascading water in steps "c" through "e" from one lake to another lake with simultaneous drops in elevation from the outer lake to the inner lake to the breathing brine area.

15. The method of claim 14 wherein there are at least two inner lakes.

16. The method of claim 14 wherein there are at least three inner lakes.

17. The method of claim 14 further comprising providing the breathing brine area at a position that is surrounded by all of the inner lakes.

18. The method of claim 14 further comprising maintaining in the breathing brine area some dry land.

19. The method of claim 14 further comprising maintaining in the breathing brine area a brine reservoir having some water with a high salinity that is higher than the salinity of one of the smaller lakes.

20. The method of claim 14 further comprising maintaining in the breathing brine area a brine reservoir having some water with a high salinity that is higher than the salinity of water in multiple of the smaller lakes.

21. The method of claim 14 wherein each dike has an upper average elevation, and the dikes have differing respective upper elevations.

22. The method of claim 14 wherein each dike that surrounds another dike has a greater upper average elevations.

23. The method of claim 14 wherein the dikes are concentric.

24. The method of claim 14 wherein the smaller lakes are concentric lakes.

25. The method of claim 14 wherein the smaller lakes have a total water volume that is about half the volume of the saline lake.

26. A method of restoring a lake that has an influent flow stream of a first volume and an effluent flow stream that is smaller than the first volume so that the salinity of the lake is increasing over time, comprising the steps of:
   a) dividing the lake into a plurality of lake sections using dikes as dividers;
   b) providing a water flow course from a first lake section to a second lake section;
   c) wherein in step "b", the water cascades from higher to lower elevations;
   d) after step "b", transmitting water from the second lake section to a breathing brine section wherein water evaporates, leaving brine in the brine section; and
   e) wherein the salinity of water flowing in steps "b" through "d" gradually increases in salinity.

27. The method of claim 26 wherein there are at least two inner lakes.

28. The method of claim 26 wherein there are at least three inner lakes.

29. The method of claim 26 further comprising providing the breathing brine area at a position that is surrounded by all of the inner lakes.

30. The method of claim 26 further comprising maintaining in the breathing brine area some dry land.

31. The method of claim 26 further comprising maintaining in the breathing brine area a brine reservoir having some water with a high salinity that is higher than the salinity of at least one of the smaller lakes.

32. The method of claim 26 wherein each dike has an upper average elevation, and the dikes have differing respective upper elevations.

33. The method of claim 26 wherein each dike that surrounds another dike has a greater upper average elevation than the dike it surrounds.

34. The method of claim 26 wherein the dikes are concentric.

35. The method of claim 26 wherein the smaller lakes have a total water volume that is about half the volume of the saline lake.

36. A method of restoration of a highly saline lake having a periphery, a water bottom, and an influent water source that enables water to be added to the lake, comprising the steps of:
   a) forming a series of dikes that separate the highly saline lake into a plurality of smaller lakes, each having a water surface, the lakes including an outer lake that is next to the periphery and one or more inner lakes, each dike and each lake water surface having an elevation;
   b) flowing water from the influent source to the outer lake;
   c) flowing water from the outer lake to the inner lakes;
   d) providing a breathing brine area that is surrounded by the smaller lakes;
   e) flowing water from the inner lakes to the breathing brine area;
   f) cascading water in steps "c" through "e" from one lake to another lake of higher elevation with drops in elevation beginning at the outer lake, then to the inner lakes having a median elevation lower than the outer lake higher elevation and then to the brathing brine area having a lower elevation that is lower than the median elevation; and
   g) gradually increasing the salinity of the water that flows in steps "c" through "f".

37. The method of claim 36 wherein the outer lake has a lower salinity level than the salinity of any of the inner lakes.

38. The method of claim 36 wherein there are at least two inner lakes.

39. The method of claim 36 wherein there are at least three inner lakes.

40. The method of claim 36 further comprising providing the breathing brine area at a position that is surrounded by all of the inner lakes.

41. The method of claim 36 further comprising maintaining in the breathing brine area some dry land.

42. The method of claim 36 further comprising maintaining in the breathing brine area a brine reservoir having some water with a high salinity that is higher than the salinity of at least one of the smaller lakes.

43. The method of claim 36 further comprising maintaining in the breathing brine area a brine reservoir having some water with a high salinity that is higher than the salinity of water in multiple of the smaller lakes.

44. The method of claim 36 wherein each dike has an upper average elevation, and the dikes have differing respective upper elevations.

45. The method of claim 44 wherein each dike that surrounds another dike has a greater upper average elevation than the dike it surrounds.

46. The method of claim 36 wherein the dikes are concentric.

47. The method of claim 46 wherein the smaller lakes have a total water volume that is about half the volume of the saline lake.

48. The method of claim 36 wherein the smaller lakes are concentric lakes.

* * * * *